A. E. ANDERSON.
TEAT CUP FOR MILKING MACHINES.
APPLICATION FILED AUG. 11, 1916.
1,238,476.
Patented Aug. 28, 1917.
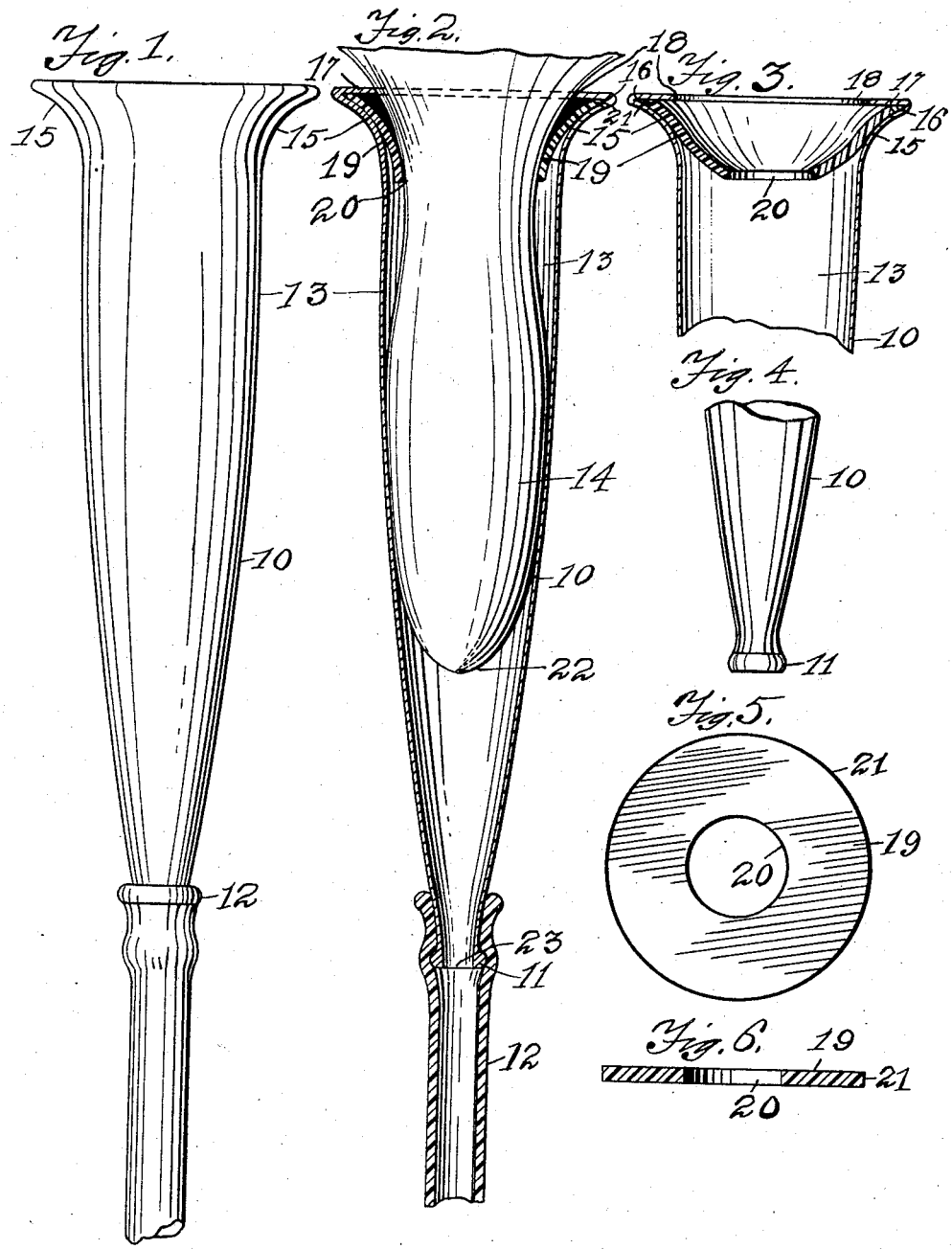

UNITED STATES PATENT OFFICE.

AUSTIN E. ANDERSON, OF RANDOLPH, NEW YORK.

TEAT-CUP FOR MILKING-MACHINES.

1,238,476.  Specification of Letters Patent.  Patented Aug. 28, 1917.

Application filed August 11, 1916. Serial No. 114,368.

*To all whom it may concern:*

Be it known that I, AUSTIN E. ANDERSON, a citizen of the United States, residing at Randolph, in the county of Cattaraugus and State of New York, have invented certain new and useful Improvements in Teat-Cups for Milking-Machines, of which the following, taken in connection with the accompanying drawings, is a specification.

The invention relates to teat cups for use with milking machines of the suction or vacuum type shown in my application for Letters Patent, Serial No. 87,248, and particularly to cups which are provided at their upper ends with means for forming an air closure between the teat and the upper rim of said cup; and the object of the invention is to retain a resilient disk in the upper end of the teat cup in such a manner that it will form an air tight joint between the surface of said disk and the inner wall of the teat cup without the use of clamps or rings or additional means for holding said disk in position, to thereby form an air tight joint between the teat and the body of the teat cup and automatically seal said upper end at this point when placed on the teat; and the invention consists in the novel features and combinations hereinafter set forth and claimed.

In the drawings, Figure 1 is an elevation of the teat cup with tube attachment at its lower end. Fig. 2 is a lengthwise sectional view of the teat cup and tube showing the flexible disk in the proper sealing position on the teat. Fig. 3 is a similar sectional view of the upper portion of the teat cup without the teat inserted, showing the normal position and depending shape taken by the flexible disk when placed in the upper end of the teat cup. Fig. 4 is an elevation of the lower end of the teat cup without the tubular connection showing the preferred contour of the same. Fig. 5 is a plan view of the flexible disk removed from the teat cup; and Fig. 6 is a diametral sectional view of the same.

Like characters of reference refer to corresponding parts in the several views.

The numeral 10 designates the teat cup which is preferably made of sheet metal in the form shown with the bead 11 around its lower end to receive the flexible tube 12, preferably of rubber, thereover in holding engagement, which tube 12 connects to a milking machine for a threefold purpose; first, to create a suction vacuum in said cup; second, to convey the milk from said cup to the milking machine; and third, to restore the air to said cup for the repetition of this milking operation.

The body portion 13 of the teat cup 10 is preferably made in the upwardly curving and enlarging form shown though other forms might be used without departing from my invention; it only being necessary to have sufficient room within said body 13 for teats 14, which are of different sizes.

The upper end of the teat cup 10 is shaped in an outwardly curved portion 15 which ends in an acute angle 16 and an inturned rigid flange portion 17 which is preferably horizontal, the flange 17 forming the annular acute angle 16 around the entire inner wall of the upper end of the teat cup 10. The flange 17 extends inward only a short distance thereby providing an opening 18 in the upper end for the insertion of the teat 14 into the cup 10.

The sealing of the upper end of the cup 10 is accomplished by means of a flexible disk 19 which is preferably made of pure sheet rubber and cut from the flat sheet in the circular form with an inner opening 20 to receive the teat 14 therethrough as shown in Fig. 2. The circumference of the flat disk 19 is diametrally larger than that within the angle 16 in the upper end of the teat cup 10 so that when said disk 19 is inserted into the upper end of the teat cup 10 the periphery 21 of the disk 19 will be wedgingly forced into the angle 16 and dependingly inclined downward through the central portion, as shown in Fig. 3, so that the outer wall of the depending disk 19 is resiliently forced against the inner wall of the curve 15 when in the normal position assumed by the flexible disk 19 with its periphery confined within the angle 16. This depending position shapes the resiliently flexible disk 19 so as to conveniently receive the end 22 of the teat 14 so that as soon as said lower end 22 is inserted into and closes the opening 20 in the center of the disk 19 the suction action will begin to take effect and will draw the cup 10 onto the teat into the position shown in Fig. 2.

As the suction takes place within the teat cup when it is in proper position on the teat there will be created an atmospheric pressure on the outside of the cup which will force the outer portion of the disk 19 downward and hold it tightly against the curved inner wall portion 15 and will thus cause the disk 19 and said wall portion 15 to form a positively air tight joint. This sealing of the upper end of the cup 10 permits a semivacuum of the teat cup 10 thereby withdrawing the milk from the teat 14 which flows down through the orifice 23 in the lower end of the cup and through the tube 12 to the milking machine.

It is apparent that the teat cup 10 is an exceedingly simple device in its construction and that while it is efficient and sanitary without the use of complicating devices and especially for securing the disk 19 in position, said disk 19 can be easily removed from the teat cup by inserting the finger through the opening 20 and pulling said disk 19 from the cup 10 and as easily returning it to position in the wedge shaped angle 16, the resilience of the rubber wedgingly forcing the periphery 21 into said angle 16 as hereinbefore stated.

It is also obvious that the teat 14 can be easily removed from the cup 10 as soon as the suction action is removed from said cup.

I claim as new:

1. In combination with a teat cup, flexible means disposed completely in the upper end of the teat cup and through which the teat extends, said teat cup shaped so that said flexible means will be pressed against the inner wall of the teat cup in sealing engagement by atmospheric pressure when suction takes place within said cup.

2. A teat cup for milking machines comprising a metallic teat cup to receive the teat in the upper end thereof, an outward and inward extending upper portion, said cup having to form an acute angle therewithin, and a resilient flexible disk having a central hole therethrough for the teat for sealing therewith, the diameter of said disk larger than the diameter of the inner wall at said acute angle to confine said disk in said angle with a normal central dependence against said outward extending portion.

3. A teat cup for milking machines comprising a cup member having an inturned flange on the upper end to form an angle with the out-turned side of the cup adjacent said flange, and a resilient flexible disk having a hole therethrough for the teat for sealing therewith, said disk larger in diameter than the space within said angle adjacent said flange to seal the upper end of the cup by atmospheric pressure against said out-turned wall of the cup when suction takes place within said cup.

4. A teat cup for milking machines comprising a metallic teat cup having an opening in the upper end to receive the teat therein, and comprising an outwardly curved upper portion on the upper end of said cup with a substantially horizontal inturned flange to form a retaining angle between said flange and curved portion, a resilient flexible sealing disk having a central hole therethrough for the teat, the diameter of said disk larger than the diameter of the inner wall of said cup at said acute angle to confine said disk in said angle with a central dependence upon said curved upper portion to be drawn thereagainst by suction from the lower end of the cup.

5. A teat cup for milking machines comprising a cup member having an inturned substantially horizontal flanged edge on the upper end with a central opening to receive the teat therethrough, the sides of the cup below said flange curved outwardly to form an acute holding angle with said flange, a flat rubber sealing disk having a central opening therethrough for the teat, the diameter of said disk larger than the diameter of the space between the inner walls of said cup at said acute angle to confine said disk in said angle with a central dependence on said curved portion, said cup having a gradually diminishing lower portion with a bead on the lower end of the same, and a flexible tube on said lower end to create suction therethrough.

6. In a teat cup, a cup member having a flared outer end, a perforated disk seated on said flared end, and means to secure the disk to said flared end, said disk having its central part extended inwardly beyond the flared end to form a vacuum space in conjunction with the flared end.

7. In a teat cup, a cup member, a perforated disk in the cup member, and an inclined seat for the disk formed so as to provide a vacuum space between the under face of the disk and seat so as to cause the surrounding air to press upon the upper face of the disk to force the latter against said seat.

8. In a teat cup, a cup member flared outwardly at its upper end and having its edge turned inwardly, and a perforated disk having its peripheral portion clamped between said edge and the flared end of the member.

9. In a teat cup, a cup member having a seat and a flexible teat receiving element secured on said seat, said seat extending inwardly of the cup member and being formed so as to leave parts of the cup member exposed whereby upon formation of vacuum below said element atmospheric pressure acting upon the upper exposed part of said element will force said element into sealing engagement with the seat.

In testimony whereof I have affixed my signature in the presence of two witnesses.

AUSTIN E. ANDERSON.

Witnesses:
H. O. SANDBERG,
P. M. SIMMONS.